(12) United States Patent
Xu et al.

(10) Patent No.: US 9,492,961 B2
(45) Date of Patent: Nov. 15, 2016

(54) ACOUSTIC CEILING TILES WITH ANTI-SAGGING PROPERTIES AND METHODS OF MAKING SAME

(71) Applicant: USG Interiors, LLC, Chicago, IL (US)

(72) Inventors: Wei Xu, Vernon Hills, IL (US); Brian A. Kemp, Chattanooga, TN (US); Mark H. Englert, Libertyville, IL (US); Martin W. Brown, Gurnee, IL (US); Terry L. Rosenstiel, Vernon Hills, IL (US)

(73) Assignee: USG INTERIORS, LLC, Chicago, IL (US)

( * ) Notice: Subject to any disclaimer, the term of this patent is extended or adjusted under 35 U.S.C. 154(b) by 0 days.

(21) Appl. No.: 14/607,504

(22) Filed: Jan. 28, 2015

(65) Prior Publication Data

US 2016/0032583 A1 Feb. 4, 2016

Related U.S. Application Data

(60) Provisional application No. 62/032,021, filed on Aug. 1, 2014.

(51) Int. Cl.
| | |
|---|---|
| *E04B 1/86* | (2006.01) |
| *B29C 47/00* | (2006.01) |
| *D04H 1/4209* | (2012.01) |
| *D04H 1/587* | (2012.01) |
| *E04B 9/00* | (2006.01) |
| *B29K 101/10* | (2006.01) |
| *B29L 31/10* | (2006.01) |

(52) U.S. Cl.
CPC ........ *B29C 47/0019* (2013.01); *D04H 1/4209* (2013.01); *D04H 1/587* (2013.01); *E04B 9/001* (2013.01); *B29K 2101/10* (2013.01); *B29K 2233/08* (2013.01); *B29L 2031/104* (2013.01)

(58) Field of Classification Search
CPC ......................................................... E04B 1/86
USPC ......................................................... 181/294
See application file for complete search history.

(56) References Cited

U.S. PATENT DOCUMENTS

| | | | |
|---|---|---|---|
| 3,907,063 A | * | 9/1975 | Nakazawa et al. ........... 181/169 |
| 5,047,463 A | | 9/1991 | Keskey et al. |
| 5,964,934 A | | 10/1999 | Englert |
| 6,855,753 B1 | | 2/2005 | Englert |

(Continued)

FOREIGN PATENT DOCUMENTS

| | | |
|---|---|---|
| EP | 1 382 642 A1 | 1/2004 |
| EP | 2 354 205 A1 | 8/2011 |

(Continued)

*Primary Examiner* — Forrest M Phillips
(74) *Attorney, Agent, or Firm* — Greer, Burns & Crain, Ltd.; Brian Wishnow; Philip T. Petti

(57) ABSTRACT

An acoustic tile with excellent anti-sagging properties is provided. The tile comprises a soy-protein binder selected from the group consisting of soy flour, soy protein concentrate, soy protein isolate and any combination thereof. In further embodiments, the tile further comprises polyamide-epichlorohydrin. Other tiles include those made with a thermosetting binder selected from the group consisting of an acrylic binder, a polyester binder, an acrylo-polyester binder and any mixture thereof. Energy-efficient methods for making the tiles are also provided.

19 Claims, 11 Drawing Sheets

(56) References Cited

U.S. PATENT DOCUMENTS

| | | |
|---|---|---|
| 7,317,053 B1 | 1/2008 | Gelman et al. |
| 7,503,430 B2 | 3/2009 | Englert et al. |
| 7,862,687 B2 | 1/2011 | Englert et al. |
| 2003/0079847 A1 | 5/2003 | Howle et al. |
| 2003/0199629 A1 | 10/2003 | Gelman |
| 2004/0231916 A1* | 11/2004 | Englert et al. ............... 181/296 |
| 2005/0284065 A1 | 12/2005 | Shaffer |
| 2007/0036975 A1 | 2/2007 | Miele et al. |
| 2007/0277948 A1* | 12/2007 | Carbo et al. ............... 162/145 |
| 2008/0060871 A1 | 3/2008 | Englert |
| 2008/0156581 A1 | 7/2008 | Englert et al. |
| 2008/0213597 A1 | 9/2008 | Li |
| 2008/0299413 A1 | 12/2008 | Song |
| 2009/0011251 A1 | 1/2009 | Englert |
| 2009/0126886 A1 | 5/2009 | Englert et al. |
| 2009/0169867 A1 | 7/2009 | Kelly |
| 2009/0173464 A1 | 7/2009 | Baig |
| 2010/0175826 A1 | 7/2010 | Huenig et al. |
| 2010/0222463 A1 | 9/2010 | Brady |
| 2011/0003522 A1 | 1/2011 | Chen et al. |
| 2011/0101260 A1 | 5/2011 | Moll et al. |
| 2011/0232854 A1 | 9/2011 | Englert |
| 2011/0266488 A1 | 11/2011 | Didier |
| 2013/0186705 A1 | 7/2013 | Payot |
| 2013/0190428 A1 | 7/2013 | Varnell |
| 2013/0245164 A1 | 9/2013 | Limerkens |
| 2013/0248283 A1* | 9/2013 | Kim et al. ............... 181/294 |
| 2014/0121304 A1 | 5/2014 | Kelly et al. |

FOREIGN PATENT DOCUMENTS

| | | |
|---|---|---|
| EP | 2 586 909 A1 | 5/2013 |
| WO | WO 2004/110748 | 12/2004 |
| WO | 2008002444 | 2/2008 |
| WO | 2013/163245 | 10/2013 |

* cited by examiner under aqueous slurries; this results in relatively inexpensive processing, and the like. In addition, the mechanical strength of the panels is dependent on the cost and type of binders used. Still further, the finishing line has a higher temperature tolerance and a higher temperature tolerance of the panels.

ACOUSTIC CEILING TILES WITH ANTI-SAGGING PROPERTIES AND METHODS OF MAKING SAME

CROSS-REFERENCE TO RELATED APPLICATIONS

This application claims the benefit of priority to U.S. Provisional Application 62/032,021 filed Aug. 1, 2014, the entire disclosure of which is incorporated herein by reference.

FIELD OF THE INVENTION

This invention is related to an acoustic ceiling tile with anti-sagging properties. The tile is made with at least one of the following binders: a thermosetting acrylic resin, a thermosetting polyester resin, soy protein and soy protein in combination with polyamide-epichlorohydrin. Energy-efficient waterless methods for making the tiles are provided as well.

BACKGROUND

Acoustic ceiling tiles are used for providing a finished appearance to a ceiling area in buildings and also for providing a sound absorbent surface where needed. Mineral wool is used in an acoustic tile because it provides a porous fibrous structure for absorbing sound. Other materials used in the manufacture of ceiling tiles may include fiberglass, expanded perlite, clay, gypsum, stucco, calcium carbonate, starch and paper fibers, as described in U.S. Pat. No. 7,503,430 to Englert et al., incorporated herein by reference in its entirety.

An acoustic tile may be made by a wet-felting process, casting, air felting or bonded process. In the wet-felting process and as described in U.S. Pat. No. 7,862,687 to Englert et al. incorporated herein by reference in its entirety, an aqueous dispersion of fibers, aggregates, binders, and other additives is dispensed onto a porous surface or wire where the furnish is dewatered, both by gravity and by vacuum suction and/or by pressing. The wet mat is dried in a convection oven and then cut into desired lengths. If desired, the surface is painted to produce a finished panel. An example of an acoustic panel is the RADAR™ ® ceiling tile made by USG Interiors (Chicago, Ill.). The modifications in the process may include drying a newly formed tile in a kiln and also fortifying the tile by including a fiberglass basemat or by laminating a scrim or veil.

Another process for making ceiling panels is by casting. A composition of mineral wool fibers, fillers, colorants, a binder such as cooked starch and water is placed in trays covered with paper or paper-backed foil. The composition is then screeded with a forming plate to the desired thickness. A decorative surface, such as an embossed pattern, can be obtainable by imparting a pattern into the surface of the cast material by use of a screed bar or a patterned roll. Cast® ceiling tile by USG Interiors (Chicago, Ill.) is an example of a cast panel.

Both of these methods for making ceiling panels are relatively expensive because they utilize large amounts of water and energy. Hygroscopic binders, such as paper or starch, result in panels that are susceptible to sag. Sagging of the panel can be accentuated when the panel supports insulation or other loads or when subjected to high levels of humidity and temperature.

Thus, it would be advantageous to develop new compositions for tiles and methods in which no water or very little water is used for making a ceiling panel. Further, there is a need for binders that can be used in place of starch and which would improve the anti-sagging properties of an acoustic tile without diminishing the noise reduction properties.

SUMMARY

At least some of these needs are addressed by the present invention. One embodiment provides an acoustic tile comprising mineral wool and a soy protein binder selected from the group consisting of soy flour, soy protein concentrate, soy protein isolate and any combination thereof. In the tile, the mineral wool is cross-linked with the soy protein binder. In some embodiments, the mineral wool comprises from 50% to 95% of the tile by weight. At least in some embodiments, the tile is made with soy flour as a soy protein binder and polyamide-epichlorohydrin which is used as a cross-linking agent for soy flour.

Further embodiments provide a method for obtaining an acoustic panel. In this method, molten mineral wool is produced first by melting slag, basalt, concrete debris or any mixture thereof. Mineral wool fibers are then spun from the molten mineral wool and a soy protein binder is sprayed on the mineral wool fibers. An acoustic panel is then formed from the mineral wool fibers sprayed with the soy protein binder. Various soy protein binders are suitable for this method, including soy flour, soy protein concentrate, soy protein isolate and any mixture thereof. In some embodiments of the method, polyamide-epichlorohydrin is sprayed onto mineral wool fibers in addition to soy protein binder.

Further embodiments provide an acoustic tile comprising mineral wool and a thermosetting binder selected from the group consisting of an acrylic binder, a polyester binder, an acrylo-polyester binder and any mixture thereof. In this tile, the mineral wool is cross-linked with the thermosetting binder. Is some embodiments, the mineral wool comprises from 50% to 95% of the tile by weight. At least in some embodiments, the thermosetting binder comprises up to 10% of the acoustic tile by weight.

Further embodiments provide a method of making an acoustic panel, in which molten mineral wool is produced by melting slag, basalt, concrete debris or any mixture thereof. The mineral wool fibers are then spun from the molten mineral wool and sprayed with a thermosetting binder. The acoustic panel is then formed from the mineral wool fibers sprayed with the thermosetting binder. In some embodiments, the thermosetting binder is at least one of the following: an acrylic binder, a polyester binder, an acrylo-polyester binder and any mixture thereof.

Further embodiments include a method for making an acoustic tile in which water is mixed with soy flour and the mixture is added to stucco and mineral wool and a slurry is formed. Polyamide-epichlorohydrin is then added to the slurry; and an acoustic tile is formed from the slurry. In some embodiments of the method, the ratio between soy flour and polyamide-epichlorohydrin is in the range from 2.5:1 to 10:1. In some embodiments, the method is performed with the amount of mineral wool from 50% to 95% by weight of the tile.

DETAILED DESCRIPTION

The present invention provides an acoustic tile with improved acoustic and anti-sagging properties. At least one of the following binders is used for making the acoustic tile: a thermosetting acrylic binder, a thermosetting polyester binder, a thermosetting acrylo-polyester binder, a soy protein binder or a combination of soy protein with a cross-linker such as polyamide-epichlorohydrin (PAE). In some embodiments, these binders are used as a partial or complete replacement for starch in any of the following processes: wet felted, cast or bonded process. Further embodiments provide acoustic tiles in which soy protein is used without a cross-linker. Various methods are provided for making these tiles. Such methods include cast and wet-felting methods as well as the bonded line technology in which acoustic tiles are produced by spray-coating mineral wool with a binder.

In some embodiments, the acoustic tile comprises from 40% to 95% mineral wool. In some embodiments, the acoustic tile comprises from 50% to 95% mineral wool. In some embodiments, the acoustic tile comprises from 40% to 80% mineral wool. In some embodiments, the acoustic tile comprises from 50% to 80% mineral wool. In further embodiments, the acoustic tile comprises at least 50% mineral wool. Yet in other embodiments, the acoustic tile comprises at least 60% mineral wool. In further embodiments, the acoustic tile comprises at least 70% mineral wool.

Various types of mineral wool are suitable for making acoustic tiles as described in this specification. This mineral wool includes mineral wool produced using recycled materials such as slag which is a by-product of the steel industry as well as mineral wool produced using natural minerals such as basalt and as prepared by spinning or drawing molten minerals such as slag, ceramics and basalt rock.

Suitable mineral wool includes any mineral wool, such as the chemical composition as listed in Table 1.

TABLE 1

| | Mineral Wool Composition | | | | | | |
|---|---|---|---|---|---|---|---|
| Components | $SiO_2$ | $Al_2O_3$ | CaO | MgO | $Na_2O$ | BaO | FeO |
| % | 41.1 | 10.32 | 35.8 | 10.7 | 0.2 | 0.1 | 0.3 |

Figure 1:
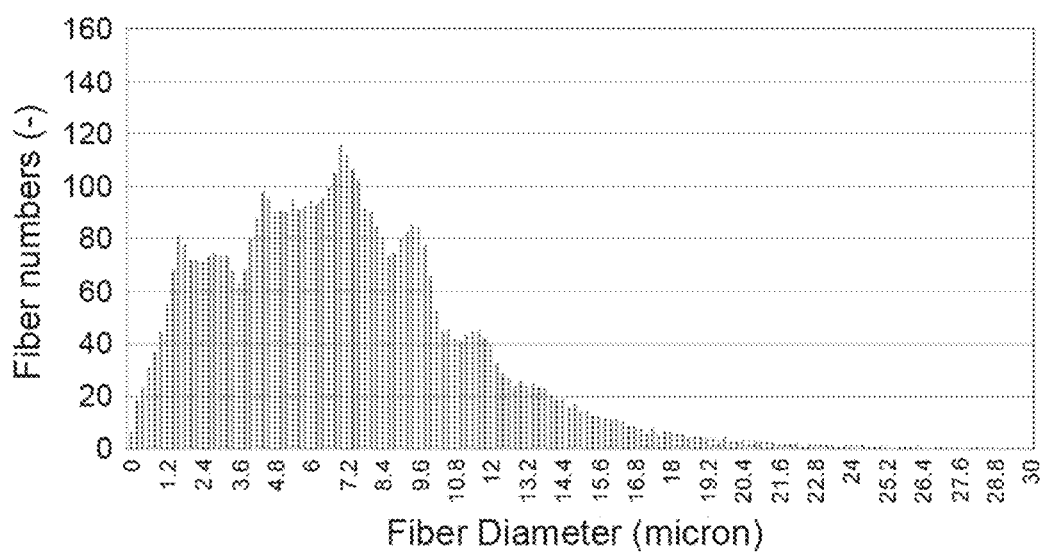
FIG. 1 is a diagram showing one example of the diameter distribution for mineral wool fibers suitable in preparation of acoustic tiles.

Mineral wools with other chemical compositions can be suitable as well. In addition to its chemical composition, mineral wool can be also classified by the fiber diameter. Mineral wool fibers with various diameters can be used. In some applications, mineral wool with fibers of an average diameter of 4.0 µm can be used, while in other applications mineral wool with fibers of an average diameter of 7.34 µm can be used as well. Mineral wool with 20% to 50% shots is suitable. FIG. 1 depicts the diameter distribution for mineral wool suitable for an acoustic tile provided by this disclosure.

Figure 2:
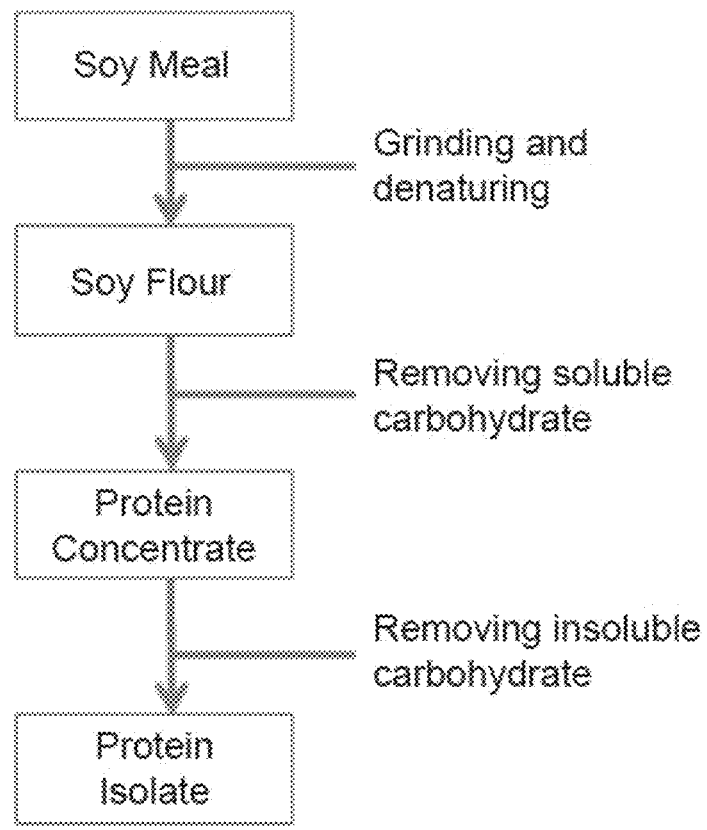
FIG. 2 is a diagram for the processing of soy flour and the various soy protein products suitable as a binder in preparation of acoustic tiles.

In some embodiments, the present tiles are made with a soy-protein binder. Various sources of soy protein can be used for preparing the present acoustic tile. Such sources include, but are not limited to, soy meal, soy protein isolate, soy protein concentrate and soy protein flour. FIG. 2 is a diagram of the processing of soy flour and the various soy protein products suitable as binders in the preparation of the present acoustic tile. In addition to the soy protein products shown in FIG. 2, other source of soy protein can be used in preparation of the present acoustic tile.

After soybean oil is extracted from soybeans, the left-over after-extraction soybean solids are called soy meal. Various soy protein products can be obtained from the soy meal, including three categories of soy proteins shown in FIG. 2: soy flour, soy protein concentrate and soy protein isolate. Soy flour is obtained by grinding and denaturing soy meal. The soy protein concentrate can be obtained from soy flour by removing soluble carbohydrates. The soy protein isolate is then obtained from the soy protein concentrate by removing insoluble carbohydrates.

Each of the three soy protein products, soy flour, the soy protein concentrate and soy protein isolate, is suitable as a binder for the present acoustic tile. In some embodiments, soy flour is used as a binder. In other embodiments, the soy protein concentrate is used as a binder. Yet in other embodiments, acoustic tiles are made with the soy protein isolate. Further embodiments include tiles in which at least two of the following: soy flour, the soy protein concentrate and soy protein isolate are used as a mixture.

In some embodiments, a suitable soy protein binder consists of soy flour with approximately 50% protein, 25% soluble carbohydrate and 25% insoluble carbohydrate.

In other embodiments, a suitable soy protein binder comprises the soy protein concentrate which is obtained by removing soluble carbohydrates from soy flour.

In further embodiments, a suitable soy protein binder comprises the soy protein isolate which is obtained by removing insoluble and soluble carbohydrates from soy flour.

A person of skill will appreciate that various soy protein products are suitable as a soy protein binder in various embodiments, including soy flour from Cargill, Inc. and soy flour, soy protein concentrate and soy protein isolate from Archer Daniel Midland, Inc. Soy protein from other providers is suitable as well.

The soy protein solubility in water is measured as Protein Dispersibility Index (PDI), with PDI=100 meaning 100% solubility in water. Suitable soy protein binders include those with various Protein Dispersibility Index (PDI) and various Nitrogen Dispersibility Index (NDI). In some embodiments, the preferred soy protein binder is soy flour with PDI in the range from 4 to 90. In other embodiments, suitable binders include soy flour with the PDI in the range from about 20 to about 90. In further embodiments, suitable binders include soy flour with PDI in the range from 70 to 90. Soy flour with PDI higher than 50 is preferred in at least some embodiments.

In some embodiments, soy flour can be used as a binder in a composition for an acoustic tile without the need of a curing agent. In other embodiments, a curing agent is used in combination with soy flour in the acoustic tile composition in order to promote cross-linking of mineral wool fibers in an acoustic tile. At least in some embodiments, a suitable curing agent includes polyamide-epichlorohydrin (PAE). At least in some embodiments, a composition for the acoustic tile comprises mineral wool and a soy protein binder. In further embodiments, a composition for the acoustic tile comprise mineral wool, a soy protein binder and PAE.

In some embodiments, when a soy protein binder is used, it is added to mineral wool and the rest of components, and then cross-linked with a chemical compound that triggers cross-linking in soy protein formulation. A soy-protein binder can be used as soy flour. A suitable cross-linker for soy protein includes a KYMENE™ additive from Ashland, Inc. which is based on polyamide-epichlorohydrin chemistry. U.S. Pat. No. 6,855,753 to Englert incorporated herein by reference, discloses the use of polyamide-epichlorohydrin as a binder in a wet-felting process for acoustic tiles.

Further suitable sources for a soy protein binder include SOYAD™ (a soy protein binder with KYMENE™ from Ashland, Inc.). Generally, a soy protein binder can be used in the amount from 2% to 20% of the total weight of a freshly mixed composition for making an acoustic tile. In some embodiments, a soy protein binder can be used in the amount from 5% to 10% of the total weight of a freshly mixed composition for making an acoustic tile. In some embodiments, a soy protein binder can be used in the amount from 2% to 15% of the total weight of a freshly mixed composition for making an acoustic tile. In further embodiments, a soy protein binder can be used in the amount from 2% to 10% of the total weight of a freshly mixed composition for making an acoustic tile.

The amount of a polyamide-epichlorohydrin cross-linker depends on the amount of a soy protein binder to be used. Generally, the ratio of a soy protein binder, such as for example soy flour, to polyamide-epichlorohydrin such as for example, KYMENE™, is from 10:1 to 2.5:1. In some embodiments, the ratio is from 10:1 to 5:1. At least in some embodiments, the ratio is 6:1.

Figure 3:
FIG. 3 is a picture of an acoustic tile made with soy protein using the cast process.
Figure 4:
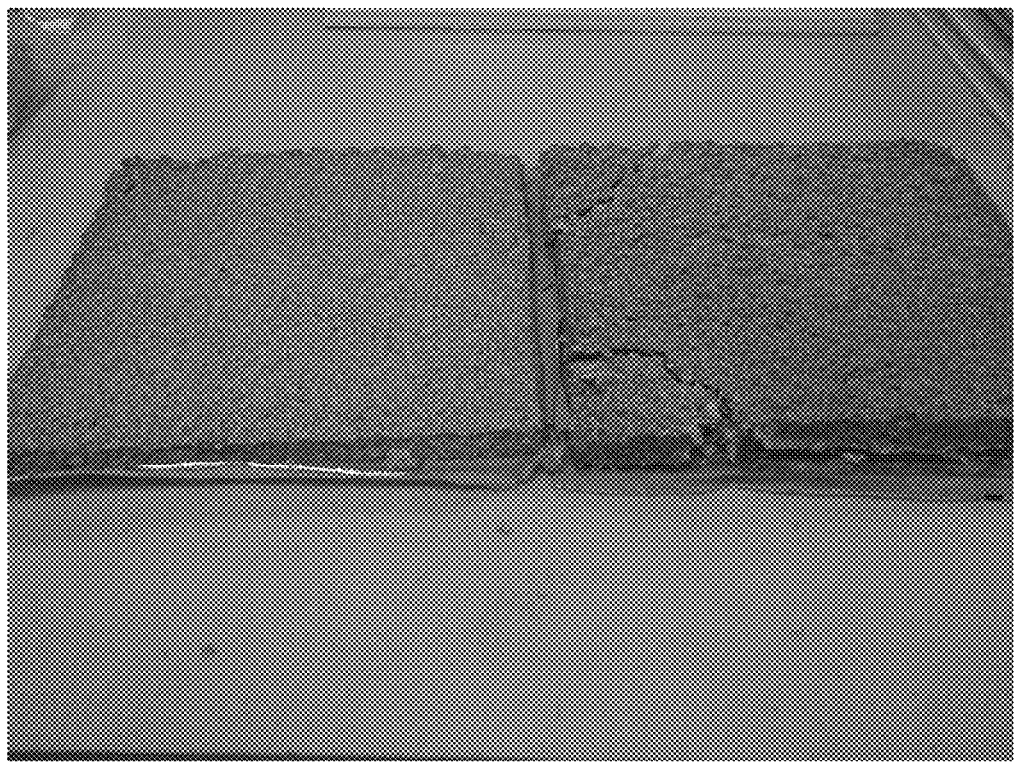
FIG. 4 is a comparative picture of an acoustic tile made with soy protein (right) or starch (left) and dried in an oven using the cast process.

Various attempts have been made to prepare an acoustic tile with soy flour as a binder. However, soy flour creates a great deal of foam when mixed with mineral wool, water and other components. This results in an acoustic tile with very low density as shown in FIG. 3. Such tiles are not suitable for construction as they are very weak and cannot be efficiently dried in an oven as shown in FIG. 4 because of cracking and burning.

Surprisingly, the inventors have discovered that when soy flour is used in combination with polyamide-epichlorohydrin as a cross-linker, the foaming is decreased and the density is improved. A significant improvement has been achieved by adding a defoamer.

Further embodiments provide an acoustic tile comprising mineral wool cross-linked with soy protein and polyamide-epichlorohydrin and which further comprise a defoamer. Suitable defoamers include insoluble oils, polydimethylsiloxanes and other silicones, certain alcohols, stearates and glycols. One particularly useful defoamer is Deefo 542 from Ultra Additives, Inc., Paterson, N.J., which is a mixture comprising petroleum distillates, synthetic wax, the reaction product of silicon dioxide and an organosiloxane copolymer, as well as solvent-refined heavy and light paraffins. The defoamer can be added in any amount sufficient for inhibiting foam formation in mixtures with soy protein and polyamide-epichlorohydrin.

Soy four can be used in various amounts. In some embodiments, the amount of soy flour is from 5% to 20% by weight of solids. In further embodiments, the amount of soy flour is from 7.5% to 12.5% by weight of solids. The amount of polyamide-epichlorohydrin depends on the amount of soy flour used. In some embodiments, the ratio between soy flour and polyamide-epichlorohydrin is from 2.5:1 to 10:1. At least in some embodiments, the ratio is at about 3:1 to 6:1.

The inventors have also unexpectedly discovered that the combination of soy protein with polyamide-epichlorohydrin acts as a coagulant in addition to be a binder. This improves the retention of soy binder on mineral wool fibers in a wet felted process. Thus, some embodiments are performed with no need for using a flocculent in compositions with mineral wool, soy protein and polyamide-epichlorohydrin.

Figure 5:
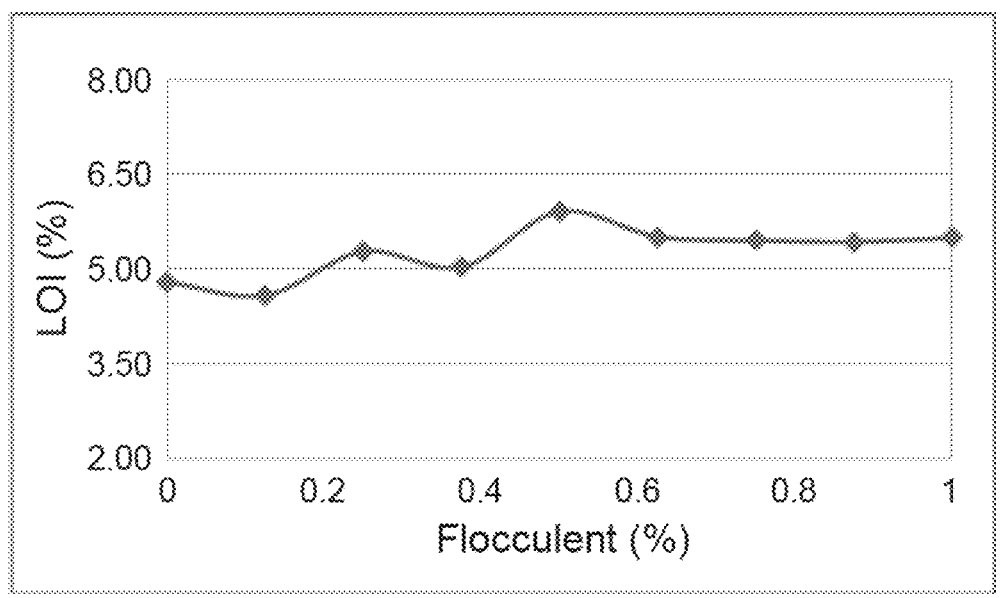
FIG. 5 is a graph showing that the retention of soy protein/polyamide-epichlorohydrin binder (LOI) is not affected by increasing the amount of a flocculent in a wet felted process.
Figure 6:
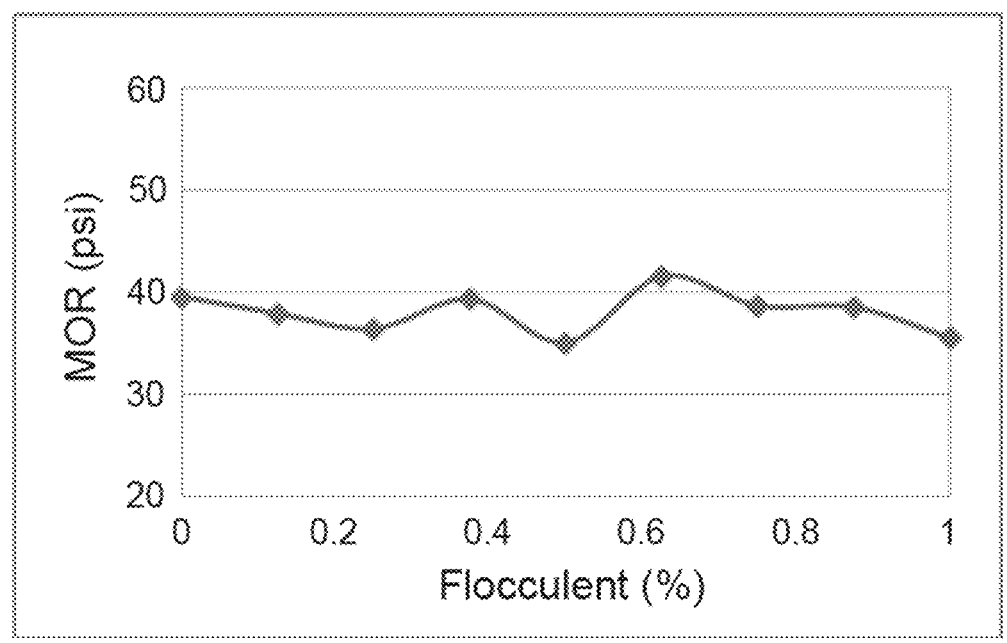
FIG. 6 is a graph showing that the flexural strength (MOR) of a wet felted board made with soy protein and polyamide-epichlorohydrin is not affected significantly by the increase in the amount of a flocculent.

As shown in FIG. 5, the retention of soy protein/polyamide-epichlorohydrin binder (LOI) is not affected by increasing the amount of a flocculent. Further and as shown in FIG. 6, the flexing strength (MOR) of a board made with soy protein and polyamide-epichlorohydrin is not effected significantly by the increase in the amount of a flocculent used.

Figure 7:
FIG. 7 is a set up for a sagging test.
Figure 8:
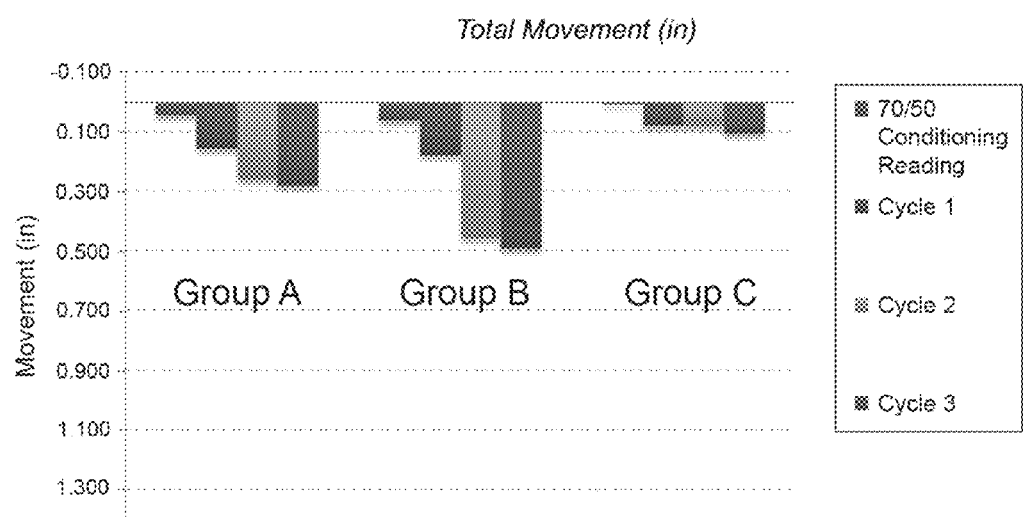
FIG. 8 is a graph showing that anti-sagging properties of an acoustic tile made with a soy flour/polyamide-epichlorohydrin depend on a concentration of soy protein and polyamide-epichlorohydrin used. Sample A tile was made with 10% soy flour/polyamide-epichlorohydrin; sample B tile was made with 7% soy flour/polyamide-epichlorohydrin, and Sample C tile was made with 7% latex binder.

As reported in FIG. 8, additional tests have shown that an acoustic tile made with soy flour/polyamide-epichlorohydrin has excellent anti-sagging properties which are dependent on a concentration of soy protein and polyamide-epichlorohydrin used. In these tests, a tile is prepared with either 10% soy flour/PAE (Group A), 7% soy flour/PAE (Group B) or it is prepared with 7% latex binder (Group C), as shown in FIG. 7. The movement of each of the tiles is measured after conditioning and after each of the three cycles in which the temperature was raised to 90° F. and 90% humidity and then decreased to 70° F. and 50% humidity. Less sagging was reported for tiles with 10% soy flour/PAE in comparison to tiles made with 7% soy flour/PAE, as shown in FIG. 8.

Figure 9:
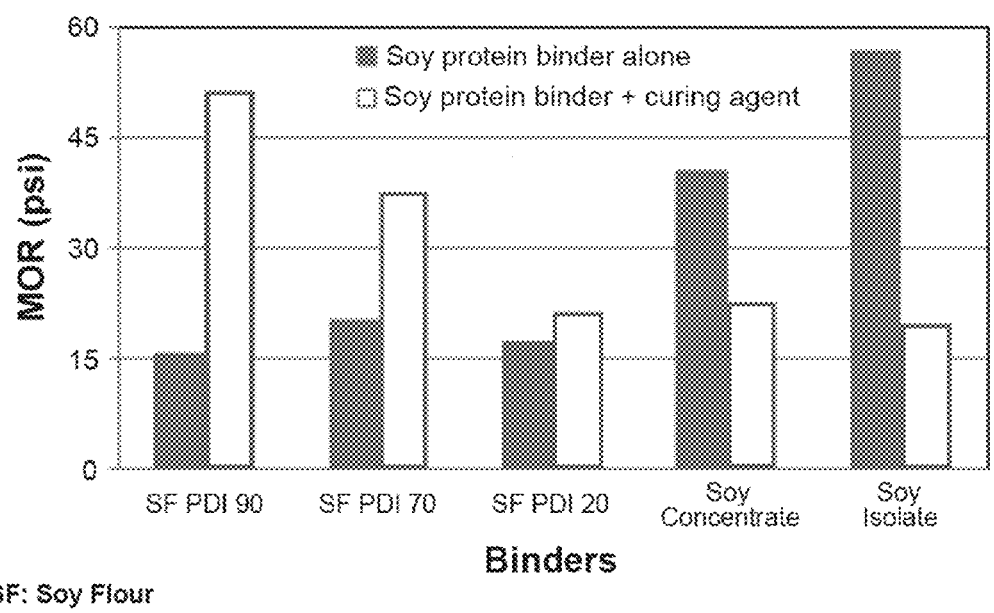
FIG. 9 is a graph reporting the flexural strength (MOR) for tiles with different soy protein binders used either alone (shaded bars) or in combination with a polyamide-epichlorohydrin as a curing agent (cross-linker) (open bars)

Further unexpected results are revealed in comparative tests of tiles prepared with either soy flour, soy concentrate or soy isolate. Each of the soy protein binders was tested either alone or in combination with a polyamide-epichlorohydrin curing agent. As shown in FIG. 9, the flexural strength (MOR) of an acoustic tile depends on a source of soy protein. When used without a curing agent, soy protein isolate is the strongest adhesive, followed by protein concentrate and soy flour, respectively. The terms "curing agent" and "cross-linker" are used in this disclosure interchangeably.

Surprisingly and also as shown in FIG. 9, adding a curing agent such as polyamide-epichlorohydrin improves the flexural strength of tiles made with soy flour, but does not improve significantly the flexural strength of tiles made with a soy protein isolate or soy protein concentrate. Thus, the use of soy flour protein with a polyamide-epichlorohydrin curing agent is contemplated in some preferred embodiments. In other preferred embodiments, a soy protein isolate or soy protein concentrate can be used without a polyamide-epichlorohydrin curing agent.

The performance of soy flour as a binder can be improved by adding a curing agent. In some embodiments, soy flour is mixed with mineral wool and other components and a curing agent is then added to the mixture. While various curing agents can be used, the preferred curing agents include polyamide-epichlorohydrin. The use of a curing agent is particularly beneficial for soy flours with a high PDI. The high PDI soy flours include soy flours with a PDI in the range from about 50 to about 100.

At least in some formulations, stucco (calcined gypsum, calcium sulfate hemihydrate, calcium sulfate anhydrite) can be used in a composition for an acoustic tile. If stucco is added to a composition for an acoustic tile, it should be added in the amount of less than 20% by weight of solids in the composition. Table 2 provides one inventive composition for an acoustic tile with improved anti-sagging properties.

TABLE 2

Acoustic Tile Composition

| Component | Dry Weight (% of total solids) |
|---|---|
| Mineral Wool | 50-95 |
| Soy Flour | 5-20 |
| Polyamide-Epichlorohydrin | 1-6 |
| Water | As needed to make a workable slurry |

In other embodiments, an acoustic tile can be made using the bonded process with a thermosetting acrylic binder and without starch. Suitable thermosetting acrylic binders include a formaldehyde-free acrylic binder. Such binders include a NF-4AD™ binder from HB Fuller, Inc., which is a binder based on acrylic chemistry and blended with hydroxyl functional groups to form an acrylo-polyester network after cross-linking. A thermosetting acrylic binder can be used in the amount from 2% to 20% of the total weight of a freshly mixed composition for making an acoustic tile. In some embodiments, a thermosetting acrylic binder can be used in the amount from 5% to 10% of the total weight of a freshly mixed composition for making an acoustic tile. In some embodiments, a thermosetting acrylic binder can be used in the amount from 2% to 15% of the total weight of a freshly mixed composition for making an acoustic tile. In further embodiments, a thermosetting acrylic binder can be used in the amount from 2% to 10% of the total weight of a freshly mixed composition for making an acoustic tile. Some embodiments include compositions with 5% of a thermosetting acrylic binder.

In other embodiments, an acoustic tile can be made using the bonded process with a polyester binder and without starch. Suitable polyester binders include a formaldehyde-free polyester binder. Such binders include an ACRO-DUR™ binder from BASF, Inc., which is a binder based on polyester chemistry and it sets after being cured by heat. A thermosetting polyester binder can be used in the amount from 2% to 20% of the total weight of a freshly mixed composition for making an acoustic tile. In some embodiments, a thermosetting polyester binder can be used in the amount from 5% to 10% of the total weight of a freshly mixed composition for making an acoustic tile. In some embodiments, a thermosetting polyester binder can be used in the amount from 2% to 15% of the total weight of a freshly mixed composition for making an acoustic tile. In further embodiments, a thermosetting polyester binder can be used in the amount from 2% to 10% of the total weight of a freshly mixed composition for making an acoustic tile. Some embodiments include compositions with 5% of a thermosetting polyester binder.

In addition to mineral wool and at least one of the binders selected from a soy protein binder, polyacrylic binder and polyester binder, an acoustic tile may comprise various other organic and inorganic fibers. Such organic fibers include, but are not limited to, cellulosic fibers such as paper, recycled newsprint, straw, nut hulls and the like. Inorganic fibers include, but not limited to, glass fibers. These organic and/or inorganic fibers can be added in the amount from 10% to 50% of by weight of a composition for making an acoustic tile.

Further components in the present tile composition may include lightweight fillers which decrease the weight of an acoustic tile. Suitable light weight fillers include, but are not limited to, expanded polystyrene, expanded vermiculite, expanded perlite, ceramic microspheres, resin microspheres and the like or combinations thereof.

The lightweight aggregate is provided in any amount to produce the desired amount of filler space, reduction in overall density and/or finished panel weight. For example, the lightweight aggregate is present in an amount of from about 0.2% to about 65% by weight of the finished layer. Expanded perlite, expanded vermiculite and expanded polystyrene are examples of preferred lightweight aggregates. Preferably, the expanded polystyrene has an average length of 2 mm or less. In preferred embodiments, a finely chopped expanded polystyrene has a bulk density of about 0.2 lb/ft3 to about 0.5 lb/ft3, the lightweight aggregate is provided in an amount of about 0.2% by weight to about 3% by weight of the solids in the composition for an acoustic tile.

Various methods can be used for manufacturing an acoustic tile from compositions described above. In some embodiments, an acoustic tile can be made by a wet-felting process or by casting. In one embodiment for this method, soy flour is dispersed in water and mixed together with mineral wool and other components. Polyamide-epichlorohydrin (such as for example, KYMENE™) is added right before the casting. The ratio between water and solids in the mixture is kept from 75:50 to 50:50. The ratio between soy flour and polyamide-epichlorohydrin is kept in the range from 10:1 to 2.5:1. In some embodiments, the ratio between soy flour and polyamide-epichlorohydrin is kept in the range from 10:1 to 5:1. In some embodiments, the ratio between soy flour and polyamide-epichlorohydrin is at 6:1. In other embodiments of a wet-felting process or casting, mineral wool is mixed with water, a polyacrylic binder or polyester binder, and other components.

The inventors have also developed a bonded line method for producing an acoustic tile with a soy protein binder without starch. This method can also be practiced with a polyacrylate binder or a polyester binder. This method has significant advantages over other methods in which water is used, as there is no need to remove water after a tile is formed. This results in an ultra-light acoustic tile with low density, homogeneous distribution of mineral wool, excellent noise reduction and anti-sagging properties. Further, significant energy savings are achieved as there is no need to dry a tile and evaporate the excess water.

Figure 10:
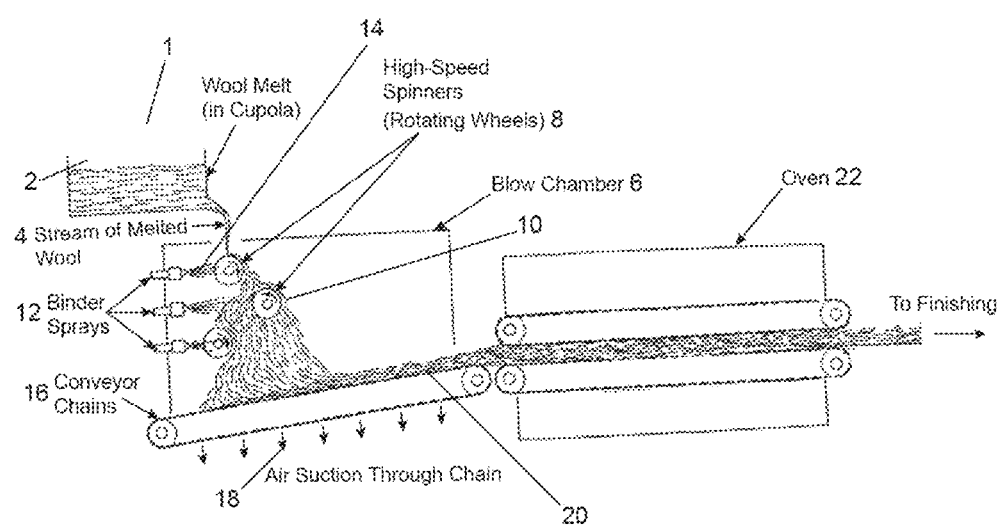
FIG. 10 is a schematic of the bonded line technology (BLT)

FIG. 10 is a schematic of one embodiment for the bonded line method, in which slag, ceramic fibers, basalt, concrete debris or other material (1) suitable for mineral wool production is melted in cupola (2) to produce molten mineral wool (4). The stream of molten mineral wool (4) is then passed into a blowing chamber (6) and onto high-speed spinners such as rotating wheels (8) which spin mineral wool fibers (10). The blowing chamber (6) is equipped with at least one binder sprayer (12) which sprays a binder (14) onto mineral wool fibers (10) as they are spun by spinners (8). The binder (14) can be any of the soy protein binders described above or any polyacrylic binder or a polyester binder as described above. The binder/mineral wool mixture reaches a conveyor (16) and an acoustic panel (20) is then formed. The conveyor (16) can be equipped with at least one air suction device (18) which facilitates formation of the acoustic panel (20) which exits the blowing chamber (6) via the conveyor (16) and is moved into an oven (22). After drying, the panel (20) is cut into products of a desired size and packaged for shipping.

If soy flour is used as a binder, polyamide-epichlorohydrin (PAE) is applied in some embodiments by spraying through at least one sprayer (12) in the blowing chamber (6), and acoustic tiles are formed in which soy protein is cross-linked with mineral wool and other optional components by polyamide-epichlorohydrin. This method is performed without starch.

In other bonded line method embodiments, mineral wool is prepared by melting as described in connection with FIG. 10. A thermosetting acrylic binder such as NF-4AD or a thermosetting polyester binder such as ACRODUR™ is applied by spraying in the blowing chamber (6). An acoustic tile is then formed and it comprises mineral wool and other optional components cross-linked with the thermosetting binder. In this method, a polyacrylic or polyester binder may be used at various viscosity, including with the viscosity in the range from about 500 cps to about 1500 cps.

In some embodiments, the viscosity is in the range from 500 to 1000 cps. In some embodiments, the viscosity is in the range from 750 to 1250 cps. A pH of a polyacrylic or polyester binder may vary and it can be in the range from about 2.0 to about 5.0. In some embodiments, the pH range is from about 3.0 to about 4.5. In further embodiments, the pH range is from about 2 to about 4.

Various mineral wools are suitable for the bonded line method, including that with a composition listed in Table 1 and with fiber diameters as shown in FIG. 1.

The Noise Reduction Coefficient (NRC) is a scale representation of the amount of sound energy absorbed upon striking a particular surface, with the NRC value of 0 indicating perfect reflection and the NRC value of 1 representing perfect absorption of sound energy. Embodiments include an acoustic tile with the NRC of at least 0.55 and prepared with mineral wool and a soy protein binder. In some embodiments, the NRC coefficient is at least 0.70. Other embodiments include an acoustic tile with the NRC of at least 0.55 and prepared without starch from mineral wool and a polyacrylic binder or polyester binder. In some embodiments, the NRC coefficient is at least 0.70. The acoustic tiles have excellent anti-sagging properties as shown in FIG. 8.

In some embodiments, an acoustic tile is produced by the bonded line method as shown in FIG. 10. Various tiles include those with properties listed in Table 3 below.

TABLE 3

| | | Acoustic Tiles | | |
|---|---|---|---|---|
| Binder | Target Binder % | Target Density (kg/m³) | Target Thickness (mm) | Tile Formulation Name |
| Polyacrylic Binder (NF4 AD) | 5 | 70 | 15 | Tile Formulation #1 |

TABLE 3-continued

| | | Acoustic Tiles | | |
|---|---|---|---|---|
| Binder | Target Binder % | Target Density (kg/m³) | Target Thickness (mm) | Tile Formulation Name |
| Polyacrylic Binder (NF4 AD) | 5 | 70 | 27 | Tile Formulation #2 |
| Polyacrylic Binder (NF4 AD) | 5 | 100 | 15 | Tile Formulation #3 |
| Polyacrylic Binder (NF4 AD) | 5 | 100 | 27 | Tile Formulation #4 |
| Polyester Binder (ACRODUR 95L) | 5 | 130 | 43 | Tile Formulation #5 |

In further embodiments, after the acoustic panel is formed by the bonded line method, it can be further laminated with a scrim. Suitable scrims include plastic, fiberglass, fabric and metal scrims. In some embodiments, a scrim is attached to the acoustic panel with an adhesive. Various adhesives are suitable, including a polyurethane-based adhesive.

Various tiles prepared by the bonded line method include those laminated with a scrim and with the NCR value over 0.75, as listed in Table 4 below.

TABLE 4

| | NRC Values for Acoustic Tiles | | | | |
|---|---|---|---|---|---|
| Product | Thickness (inches) | Density (pcf) | Resin Content (%) | Resin Type | NRC/SAA |
| Tile Formulation #1 (PAB1) | 0.57 | 4.87 | 5.3 | Acrylic | 0.80 (0.8120) |
| Tile Formulation #2 (PAB2) | 1.17 | 4.29 | 5.1 | Acrylic | 1.0 (1.0178) |
| Tile Formulation #3 (PAB3) | 0.58 | 6.54 | 5.7 | Acrylic | 0.90 (0.8816) |
| Tile Formulation #4 (PAB4) | 1.33 | 6.95 | 4.9 | Acrylic | 1.0 (1.0140) |
| Tile Formulation #5 (PSTB) | 2.18 | 6.54 | 5.2 | Polyester | 1.1 (1.0990) |
| Comparative Tile (C) | 0.627 | 7.14 | 5.38 | Polymeric Binder | 0.85 (0.8629) |

Figure 11:
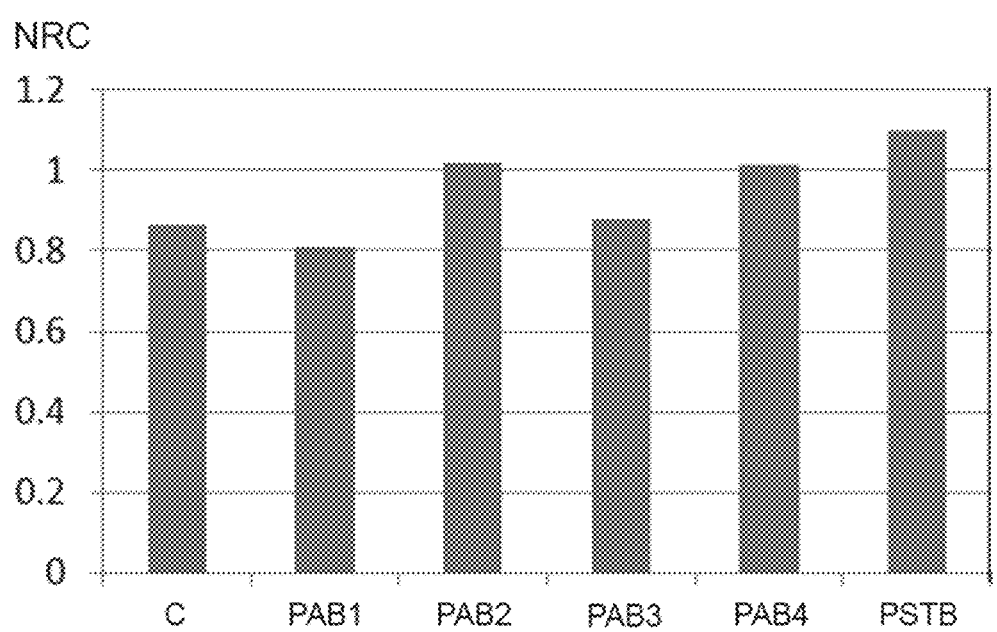
FIG. 11 reports NRCs for acoustic tiles obtained by the bonded line method.

FIG. 11 reports the NRC values for tiles listed in Table 4 in a graphic form.

Further description is provided below by the way of the following non-limiting examples.

EXAMPLE 1

Acoustic tiles were made using the cast process by mixing mineral wool, stucco and soy flour with water in the following amounts:

TABLE 5

| Parameters for Cast Tile | | | |
|---|---|---|---|
| Cold H₂0 (g) | Soy Flour (g) | Stucco (g) | Wool (g) |
| 3000 | 175 | 141 | 871 |

There was no difficulty to make the tiles with soy flour as the binder, but the mixture foamed so much that the density of the tile was very low (~10 pcf). FIG. 3 is a picture of the tile. Because of the low density, the tile was very weak and no further testing was performed. The drying at 250° F. of the tile was very fast compared to a regular tile made with starch, but the soy browned on the surface of the tile (FIG. 4, compare a tile made with starch on the left to a tile made with soy flour on the right).

EXAMPLE 2

Acoustic boards were prepared using the cast process with a formulation according to Table 5, but with the 100/30 ratio of soy flour/KYMENE™. First, stucco and soy flour were dissolved in one half of the total water to be used (1500 g), the other half of the water was used to dilute the KYMENE™. Then the two solutions were mixed together with mineral wool.

Three boards were made and tested for density, noise reduction and MOR and MOE. The data from this test is reported in Table 6.

TABLE 6

| Board | Density (pcf) | MOR (psi) | MOE (psi) | eNRC |
|---|---|---|---|---|
| 1 | 8.26 | 6.65 | 1093 | 0.72 |
| 2 | 8.32 | 6.25 | 1084 | 0.73 |
| 3 | 8.00 | 7.05 | 1275 | 0.73 |

As can be seen from Table 6, the noise reduction coefficient for boards made with soy protein and polyamide-epichlorohydrin was above 0.70, which means a very good acoustic property with 70% of noise being absorbed.

Additional boards were made as described above, but also including defoamer (Deefo 542) to increase the density of the board. The Soy/KYMENE™ ratio of 100:30 was used, and 1% defoamer (relative to soy flour) was used. The defoamer was very effective in removing the foaming. However, the use of defoamer resulted in the separation of water from the mixture. Two boards were made and the noise reduction coefficient for these two boards along with flexural strength are reported in Table 7 below. The drying was also very fast and the surface turned brownish.

TABLE 7

| Board | Density (pcf) | MOR (psi) | MOE (psi) | Hardness (lbf) |
|---|---|---|---|---|
| 1 | 22.83 | 116 | 13716 | 47 |
| 2 | 23.45 | 131 | 44159 | 75 |

EXAMPLE 3

Mixtures were prepared with soy flour and polyamide-epichlorohydrin as described above in Table 5, but using a wet-felted process. Specifically, the soy flour was added to and dispersed in water, then mixed together with mineral wool. At the last minute, KYMENE™ was added, followed by a flocculent for the last 20 seconds. The soy/KYMENE™ ratio was kept constant at 6:1, and resin solids were kept at 7%.

200 ml of 0.2% Bufloc 5425, a cationic polyacrylamide flocculent, was used for each board. In this study, the amount of a flocculent was incrementally decreased (relative to the maximum 200 ml) to determine the sensitivity of binder retention.

FIG. 5 shows the retention (LOI) as a function of the flocculent addition level. Practically, the flocculent does not have an appreciable effect on the retention of a soy binder. The soy/KYMENE™ alone may be sufficient for its retention. As a result, the flexural strength, (i.e., MOR) is also not affected as shown in FIG. 6. Thus, a flocculent is not required or its amount can be significantly decreased when a soy binder is used with KYMENE™ at the ratio 6:1.

EXAMPLE 4

Test boards were prepared using the wet-felted process as described above. Specifically, soy flour was added and dispersed in water and then mixed together with mineral wool. At the last minute, KYMENE™ was added, followed by a flocculent for the last 20 seconds. The soy/KYMENE™ ratio was kept constant at 6:1. Two boards were made at soy resin solids of 7% and 10% respectively. Standard amount of flocculent (200 ml 0.2% Bufloc 5425) was used. As a control, a standard mineral wool board with an acrylic/starch binder at 7% was also manufactured and tested for sag performance.

Two strips of 3"×12" were glued together using hot melt to produce 1 specimen for each board tested as shown in FIG. 7.

The sag performance for boards with 7% and 10% soy/KYMENE™ was tested in three cycles, each cycle performed at 90° F. and 90% humidity, followed by a temperature decrease to 70° F. and 50% humidity. The data from the tests is reported in Table 8 below in inches.

TABLE 8

| | 1$^{st}$ cycle | | 2$^{nd}$ cycle | | 3$^{rd}$ cycle | |
|---|---|---|---|---|---|---|
| Sample | 90/90 | 70/50 | 90/90 | 70/50 | 90/90 | 70/50 |
| 10% Soy (actual 7.5%) (Group A) | 0.300 | 0.155 | 0.284 | 0.260 | 0.293 | 0.281 |
| 7% Soy (actual 6%) (Group B) | 0.453 | 0.179 | 0.485 | 0.492 | 0.508 | 0.492 |
| 7% Latex (actual 6.7%) (Group C) | 0.094 | 0.079 | 0.092 | 0.081 | 0.094 | 0.105 |

The total movement in inches after each cycle for each board was also plotted in FIG. 8.

As can be seen from Table 8 and FIG. 8 in comparing test results for a board from Group A with 10% Soy to a board from Group B with 7% Soy, increasing the soy binder content from 7% to 10% (actual retention 6% and 7.5% respectively) improves the sag performance as the distance that a board in Group A moves is significantly shorter than the distance that a board in Group B moves.

EXAMPLE 5

Three grades of soy flour, one soy protein concentrate and one soy protein isolate were evaluated in this study. The soy flours were grade PDI 90, PDI 70 and PDI 20 from CARGILL, Inc., where PDI stands for Protein Dispersibility Index. The soy protein concentrate (Arcon SM) and soy protein isolate (Pro-Fam 974) were from ARCHER DANIEL MIDLAND, Inc.

The following procedure was followed to make wet-felted boards. For each 1'×1' board, 475 grams of mineral wool was dispersed in 12000 grams of water and mixed for 5 minutes together with a soy protein binder selected from either the soy flours, soy protein concentrate or soy protein isolate.

At the end of 5 minutes, 700 ml of a diluted flocculent (1:4) was added with mixing and then the stock was poured into a forming box, followed by vacuum and convection drying for 10 minutes. The target soy protein binder addition was 10%. Two boards were manufactured for each condition.

The manufactured boards were reduced to approximately ¾ inches in thickness and various physical properties were evaluated. Table 9 provides a summary using the three types of soy binders. For comparison, a control board using a high Tg latex for standard laboratory investigation was made and the results also included in Table 9.

TABLE 9

Physical Properties of Boards Made with
Soy Binders and Without a Curing Agent

| Soy Binder | Density (pcf) | MOR (psi) | MOE (psi) | Hardness (lbs) | LOI (%) | eNRC |
|---|---|---|---|---|---|---|
| Soy flour (PDI 90) | 10.89 | 15.8 | 2190 | 12.8 | 4.6 | 0.71 |
| Soy flour (PDI 70) | 10.84 | 20.3 | 2789 | 15.2 | 6.8 | 0.72 |
| Soy flour (PDI 20) | 11.50 | 17.4 | 2507 | 12.4 | 7.6 | 0.71 |
| Soy concentrate | 11.92 | 40.5 | 3324 | 27.6 | 8.0 | 0.68 |
| Soy isolate | 11.80 | 56.7 | 6508 | 35.9 | 9.0 | 0.68 |
| Control (high Tg latex) | 11.81 | 64.7 | 9530 | N/A | 7.8 | 0.70 |

Three grades (PDI 90, 70 and 20) of soy flour resulted in similar performance in terms of bending MOR/MOE and hardness, even though LOI (retention) increased as the PDI decreased.

The MOR (flexural strength) and hardness of a board made with a soy protein concentrate was improved by at least two times in comparison to a board made with a soy flour binder. The MOR (flexural strength) and hardness of a board made with a soy protein isolate was improved by at least three times in comparison to a board made with a soy flour binder.

The eNRC values were similar for all boards. While all soy binders were suitable, soy protein isolate and soy protein concentrate provided enhanced bonding as compared to a soy flour binder.

EXAMPLE 6

Additional tests were conducted using the wet-felted process with a soy protein binder to which curing agent polyamide-epichlorohydrin (PAE, from Ashland, Inc.) was added in the ratio 6:1. In these tests, sample boards were prepared as described above in Example 5, except the curing agent was added right before the sample boards were to be formed. The results of these tests are shown in Table 10 below.

TABLE 10

Physical Properties of Boards Made with Soy Binders
and a Curing Agent (polyamide-epichlorohydrin, PAE)

| SOYAD From | Density (pcf) | MOR (psi) | MOE (psi) | Hardness (lbs) | LOI (%) | eNRC |
|---|---|---|---|---|---|---|
| Soy Flour (PDI 90) + PAE | 12.47 | 51.3 | 5690 | 37.7 | 7.04 | 0.68 |
| Soy Flour (PDI 70) + PAE | 12.16 | 37.7 | 2907 | 21.6 | 7.10 | 0.69 |
| Soy Flour (PDI 20) + PAE | 12.06 | 21.5 | 2437 | 13.1 | 7.14 | 0.70 |
| Soy Concentrate + PAE | 12.08 | 22.73 | 1907 | 14.5 | 9.04 | 0.69 |
| Soy Isolate + PAE | 12.96 | 19.67 | 1710 | 13.9 | 8.71 | 0.68 |

The flexural strength (as MOR in psi) was measured for all boards listed in Tables 9 and 10, and plotted in FIG. 9. As can be seen from FIG. 9, a cross-linker (curing agent) improves the flexural strength of a board made with soy flour, but it does not significantly improve the flexural strength of a board made with a soy protein concentrate or a soy protein isolate.

A cross-linker works better with a high PDI soy flour. The performance of soy flour with a high PDI (for example, with PDI 90) can be improved with a curing agent to the extent that the flexural strength of a board made with soy flour and a curing agent is better or similar to that of a board made with a soy protein concentrate or soy protein isolate.

EXAMPLE 7

Test boards were prepared with either a soy protein isolate or soy flour (PDI 90) and a curing agent (PAE) as described in Example 5. The density of the boards along with the bending flexibility and hardness were compared to these parameters for a board obtained with a high Tg latex or a phenol formaldehyde binder. The results of these tests are reported in Table 11 below.

TABLE 11

Comparative Analysis

| Binder Used in Product | Density (pcf) | Binder (%) | MOR (psi) | MOE (psi) | Hardness (lbs) |
|---|---|---|---|---|---|
| Starch/high Tg styrene acrylic latex | 16.7 | 7.0 | 95.6 | 14000 | 54.5 |
| Phenol formaldehyde | 4.6 | 11.9 | 26.1 | 747 | 12.0 |
| Acrylic Binder | 6.7 | 5.38 | 25.9 | 1732 | 13.6 |
| Soy Protein Isolate | 11.80 | 9.0 | 56.7 | 6508 | 35.9 |
| Soy flour (PDI 90) + PAE | 12.47 | 7.04 | 51.3 | 5690 | 37.7 |

As shown in Table 11 above, a soy protein isolate and soy flour with a curing agent serve as suitable binders which produce boards with acceptable flexural strength and hardness.

While particular embodiments have been shown and described, it will be appreciated by those skilled in the art that changes and modifications may be made thereto without departing from the invention in its broader aspects and as set forth in the following claims.

What is claimed is:

1. An acoustic tile comprising mineral wool and a soy protein binder selected from the group consisting of soy flour, soy protein concentrate, soy protein isolate and any combination thereof, wherein the mineral wool is mixed and cross-linked with the soy protein binder.

2. The acoustic tile of claim 1, wherein the mineral wool comprises from 50% to 95% of the tile by weight.

3. The acoustic tile of claim 1, wherein the soy protein binder comprises from 10% to 20% of the tile by weight.

4. The acoustic tile of claim 1, wherein the soy-protein binder is soy flour, and wherein the soy flour and polyamide-epichlorohydrin are in the ratio range from 2.5:1 to 10:1.

5. The acoustic tile of claim 4, wherein the soy-protein binder and polyamide-epichlorohydrin comprise up to 10% of the acoustic tile by weight.

6. The acoustic tile of claim 1, wherein the tile further comprises a defoamer.

7. A method for obtaining an acoustic tile, the method comprising the following steps:
   1) melting slag, basalt, concrete debris or any mixture thereof to produce molten mineral wool;
   2) spinning mineral wool fibers from the molten mineral wool;
   3) spraying a soy protein binder onto the mineral wool fibers; and
   4) forming the acoustic panel from the mineral wool fibers sprayed with the soy protein binder.

8. The method of claim 7, wherein the soy protein binder is selected from the group consisting of: soy flour, soy protein concentrate, soy protein isolate and any mixture thereof.

9. The method of claim 7, wherein the method further comprises spraying polyamide-epichlorohydrin.

10. An acoustic tile comprising mineral wool and a thermosetting binder selected from the group consisting of an acrylic binder, a polyester binder, an acrylo-polyester binder and any mixture thereof, wherein the mineral wool is cross-linked with the thermosetting binder.

11. The acoustic tile of claim 10, wherein the mineral wool comprises from 50% to 95% of the tile by weight.

12. The acoustic tile of claim 10, wherein the thermosetting binder comprises up to 10% of the acoustic tile by weight.

13. The acoustic tile of claim 10, wherein the thermosetting binder is an acrylic binder.

14. A method of making an acoustic panel, the method comprising:
   1) melting slag, basalt, concrete debris or any mixture thereof to produce molten mineral wool;
   2) spinning mineral wool fibers from the molten mineral wool;
   3) spraying a thermosetting binder onto the mineral wool fibers; and
   4) forming the acoustic panel from the mineral wool fibers sprayed with the thermosetting binder.

15. The method of claim 14, wherein the thermosetting binder is selected from the group consisting of an acrylic binder, a polyester binder, an acrylo-polyester binder and any mixture thereof.

16. A method for making a cast acoustic tile, the method comprising:
   1) mixing water with soy flour,
   2) adding the mixture to stucco and mineral wool and thereby forming a slurry;
   3) adding polyamide-epichlorohydrin to the slurry; and
   4) forming an acoustic tile.

17. The method of claim 16, wherein the ratio between soy flour and polyamide-epichlorohydrin is in the range from 2.5:1 to 10:1.

18. The method of claim 16, wherein the amount of mineral wool is from 50% to 95% by weight of the tile.

19. The method of claim 16, wherein a defoamer is added at the step of mixing water with soy flour.

* * * * *